United States Patent
Feng et al.

(10) Patent No.: US 10,205,719 B2
(45) Date of Patent: Feb. 12, 2019

(54) NETWORK FUNCTION VIRTUALIZATION-BASED CERTIFICATE CONFIGURATION METHOD, APPARATUS, AND SYSTEM

(71) Applicant: HUAWEI TECHNOLOGIES CO., LTD., Shenzhen, Guangdong (CN)

(72) Inventors: Chengyan Feng, Shenzhen (CN); Jing Chen, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 187 days.

(21) Appl. No.: 15/274,220

(22) Filed: Sep. 23, 2016

(65) Prior Publication Data
US 2017/0012968 A1    Jan. 12, 2017

Related U.S. Application Data

(63) Continuation of application No. PCT/CN2014/074142, filed on Mar. 26, 2014.

(51) Int. Cl.
*H04L 29/06* (2006.01)
*H04L 12/64* (2006.01)
(Continued)

(52) U.S. Cl.
CPC ........... *H04L 63/0823* (2013.01); *G06F 8/63* (2013.01); *H04L 12/6418* (2013.01);
(Continued)

(58) Field of Classification Search
CPC .................................................. H04L 63/0823
See application file for complete search history.

(56) References Cited

U.S. PATENT DOCUMENTS

2010/0138674 A1   6/2010 Dimitrakos et al.
2012/0054486 A1*  3/2012 Lakkavalli ............. G06F 21/57
                                                 713/156
(Continued)

FOREIGN PATENT DOCUMENTS

CN    101227376      7/2008
CN    101227376 A    7/2008
(Continued)

OTHER PUBLICATIONS

International Search Report dated Jan. 5, 2015 for PCT/CN2014074142, filed Mar. 26, 2014, 4 pages.
(Continued)

*Primary Examiner* — David J Pearson
(74) *Attorney, Agent, or Firm* — Womble Bond Dickinson (US) LLP

(57) ABSTRACT

The invention discloses a network function virtualization-based certificate configuration method, apparatus, and system. A virtualized network management entity obtains initial credential information of a virtualized network function entity; and installs the initial credential information onto the virtualized network function entity during or after instantiation of the virtualized network function entity, so that the virtualized network function entity obtains, from a certificate authority by using the initial credential information, a formal certificate issued by a network operator of the virtualized network function entity. The invention not only can apply to a network function virtualization scenario, but also can resolve a problem of a security risk in network function virtualization.

18 Claims, 7 Drawing Sheets

(51) Int. Cl.
*G06F 8/61* (2018.01)
*H04L 12/24* (2006.01)

(52) U.S. Cl.
CPC .......... *H04L 41/0803* (2013.01); *H04L 41/20* (2013.01); *H04L 63/0272* (2013.01); *H04L 41/0806* (2013.01)

(56) References Cited

U.S. PATENT DOCUMENTS

| | | | |
|---|---|---|---|
| 2013/0291062 A1* | 10/2013 | Bursell | G06F 21/44 726/4 |
| 2014/0082349 A1* | 3/2014 | Zarfoss, III | H04L 63/08 713/155 |
| 2015/0082418 A1 | 3/2015 | Gu et al. | |
| 2015/0188769 A1 | 7/2015 | Gu | |
| 2015/0215301 A1 | 7/2015 | Fischer et al. | |
| 2016/0335111 A1* | 11/2016 | Bruun | G06F 9/45558 |

FOREIGN PATENT DOCUMENTS

| | | |
|---|---|---|
| CN | 101681404 | 3/2010 |
| CN | 103379010 A | 10/2013 |
| CN | 103580980 | 2/2014 |
| CN | 103580980 A | 2/2014 |
| DE | 102012215167 A1 | 2/2014 |
| EP | 1975830 | 10/2008 |

OTHER PUBLICATIONS

Extended European Search Report dated Mar. 9, 2017 for PCT/CN2014/074142.

Ravindran, Ravishankar et al, "Towards Software Defined ICN Based Edge-Cloud Services", 2013 IEEE 2nd International Conference on Cloud Networking (CloudNet), Nov. 11, 2013, pp. 227-235.

Etsi, "Network Functions Virtualisation (NFV); Virtualisation Requirements", ETSI GS NFV 004 V1.1.1, Oct. 2013, p. 1-17.

* cited by examiner

NETWORK FUNCTION VIRTUALIZATION-BASED CERTIFICATE CONFIGURATION METHOD, APPARATUS, AND SYSTEM

CROSS-REFERENCE TO RELATED APPLICATIONS

This application is a continuation of International Application No. PCT/CN2014/074142, filed on Mar. 26, 2014, which is hereby incorporated by reference in its entirety.

TECHNICAL FIELD

Embodiments of the invention relate to the field of network communications technologies, and in particular, to a network function virtualization-based certificate configuration method, apparatus, and system.

BACKGROUND

In a network function virtualization (NFV) scenario, architectures of a conventional network and network node change greatly. In a new network architecture, a conventional physical telecommunications node evolves to be a virtual node on a virtualizer, and exists in a form of a virtual machine. In this way, multiple conventional physical nodes are deployed on a same physical host machine, share hardware resources, and even share resources with other third-party application software. In addition, for the convenience of dynamic migration of a virtual machine and enhancement of performance of communication between virtual machines on a same virtualizer, a conventional IP network evolves to be a virtual network by using a virtual switch and a virtual network adapter, and the virtual machines directly communicate with each other by using the virtual network, bypassing a conventional physical network device. However, communication between virtual machines inside the virtual network and communication between a virtual machine and an external network are faced with security risks, for example, mutual attacks between virtual machines, attacks by a host machine application against a host and a virtual machine, an attack by a host machine by using network intercommunication with a virtual machine network, an attack against a virtual machine by using a remote maintenance and management channel, an attack against an external network by using a network edge node, and the like. Therefore, with these communication threats facing network function virtualization, a secure connection needs to be established by using a particular security technology in virtualized communication, so as to ensure confidentiality and integrity of the virtualized communication. To establish a secure connection, X.509-based certificates need to be configured for both entities involved in virtualized communication.

A virtualized network function entity is not a conventional hardware entity, but is generated as required in a software manner and dynamically exists. In addition, an installation location of the virtualized network function entity is not fixed. Therefore, a conventional entity certificate configuration method is not applicable to the network function virtualization scenario. Further, multiple instances may coexist for one virtualized network function entity, and if a conventional entity certificate configuration method, in which certificate configuration is performed by a provider of the virtualized network function entity, is used, a same certificate is installed for multiple instances due to a same installation package of the virtualized network function entity, thereby causing a relatively severe security risk.

SUMMARY

Embodiments of the invention provide a network function virtualization-based certificate configuration method, apparatus, and system, which can resolve a problem of a security risk in existing network function virtualization.

According to a first aspect, a network function virtualization-based certificate configuration method is provided, including:

obtaining, by a virtualized network management entity, initial credential information of a virtualized network function entity; and during or after instantiation of the virtualized network function entity by the virtualized network management entity, installing, by the virtualized network management entity, the initial credential information onto the virtualized network function entity, so that the virtualized network function entity obtains, from a certificate authority by using the initial credential information, a formal certificate issued by a network operator of the virtualized network function entity.

Based on the first aspect, in a first implementation manner, the obtaining, by a virtualized network management entity, initial credential information of a virtualized network function entity includes:

receiving, by the virtualized network management entity, an instantiation request sent by a network operation and management entity, where the instantiation request includes the initial credential information of the virtualized network function entity.

Based on the first aspect, in a second implementation manner, the obtaining, by a virtualized network management entity, initial credential information of a virtualized network function entity includes:

obtaining, by the virtualized network management entity, the initial credential information of the virtualized network function entity from the virtualized network function package, an image file of the virtualized network function (VNF), the virtualized network function descriptor VNFD, or instantiation data of the virtualized network function, where the virtualized network function package, the image file, the VNFD, or the instantiation data is sent by the network operation and management entity to the virtualized network management entity before or during the instantiation of the virtualized network function entity by the virtualized network management entity, and the VNFD or the image file includes the initial credential information.

Based on the first aspect or the first or the second implementation manner of the first aspect, in a third implementation manner, the initial credential information includes but is not limited to a certificate, a pre-shared key, a token and/or a password.

Based on the third implementation manner of the first aspect, in a fourth implementation manner, when the initial credential information includes a certificate, the initial credential information includes an initial certificate and a corresponding first private key; and the initial certificate is issued by a provider or the network operator of the virtualized network function entity to the virtualized network function entity, and the first private key is a private key in a first public key-private key pair corresponding to the initial certificate.

Based on the fourth implementation manner of the first aspect, in a fifth implementation manner, the initial certificate is signed by using a private key corresponding to a root certificate or an intermediate certificate of the provider of the virtualized network function entity, where the intermediate certificate of the provider of the virtualized network function entity is a certificate issued by a lower-level sub-certificate subordinate to the root certificate of the provider of the virtualized network function entity; or the initial certificate is signed by using a private key corresponding to a root certificate or an intermediate certificate of the network operator of the virtualized network function entity, where the intermediate certificate of the network operator of the virtualized network function entity is a certificate issued by a lower-level sub-certificate subordinate to the root certificate of the network operator of the virtualized network function entity.

Based on the first aspect or the first or the second implementation manner of the first aspect, in a sixth implementation manner, the virtualized network management entity includes a first management entity network function virtualization orchestrator (NFVO), a second management entity virtualized network function manager (VNFM), a third management entity virtualized infrastructure manager (VIM), and a management and control unit of a fourth management entity network function virtualization infrastructure (NFVI);

the network operation and management entity includes an operation support system (OSS) or an element management system EMS; and the virtualized network function entity includes a virtualized network function unit VNF or a virtualized network function component VNFC.

Based on the sixth implementation manner of the first aspect, in a seventh implementation manner, the initial credential information is configured for the virtualized network function entity by the first management entity NFVO, the second management entity VNFM, or the network operation and management entity.

Based on the sixth implementation manner of the first aspect, in an eighth implementation manner, the initial credential information is sent by the first management entity NFVO to the third management entity VIM, or is sent by the second management entity VNFM to the third management entity VIM by using the first management entity NFVO, or is sent by the second management entity VNFM to the third management entity VIM.

Based on the sixth implementation manner of the first aspect, in a ninth implementation manner, the initial credential information is sent by the third management entity VIM to the management and control unit of the fourth management entity NFVI during or after instantiation of the VNF, and is installed by the management and control unit of the fourth management entity NFVI onto the virtualized network function entity by using a virtual machine.

Based on the sixth implementation manner of the first aspect, in a tenth implementation manner, the initial credential information is sent by the first management entity NFVO to the second management entity VNFM, or is sent by the network operation and management entity to the VNFM by using the NFVO, or is sent by the network operation and management entity to the VNFM.

Based on the tenth implementation manner of the first aspect, in an eleventh implementation manner, the initial credential information is installed by the second management entity VNFM onto the virtualized network function entity during or after instantiation of the VNF.

According to a second aspect, a network function virtualization-based certificate configuration method is provided, including:

obtaining, by a virtualized network function entity, initial credential information during or after instantiation of the virtualized network function entity by a virtualized network management entity; and obtaining, by the virtualized network function entity, from a certificate authority by using the initial credential information, a formal certificate issued by a network operator of the virtualized network function entity.

Optionally, the initial credential information includes but is not limited to a certificate, a pre-shared key, a token and/or a password.

Optionally, when the initial credential information includes a certificate, the initial credential information includes an initial certificate and a corresponding first private key; and the initial certificate is issued by a provider or the network operator of the virtualized network function entity to the virtualized network function entity, and the first private key is a private key in a first public key-private key pair corresponding to the initial certificate.

Optionally, the initial certificate is signed by using a private key corresponding to a root certificate or an intermediate certificate of the provider of the virtualized network function entity, where the intermediate certificate of the provider of the virtualized network function entity is a certificate issued by a lower-level sub-certificate subordinate to the root certificate of the provider of the virtualized network function entity; or the initial certificate is signed by using a private key corresponding to a root certificate or an intermediate certificate of the network operator of the virtualized network function entity, where the intermediate certificate of the network operator of the virtualized network function entity is a certificate issued by a lower-level sub-certificate subordinate to the root certificate of the network operator of the virtualized network function entity.

Optionally, the initial credential information is carried in the virtualized network function package, an image file of the virtualized network function, the virtualized network function descriptor VNFD, or instantiation data of the virtualized network function.

Optionally, the virtualized network management entity includes a first management entity NFVO, a second management entity VNFM, a third management entity VIM, and a management and control unit of a fourth management entity NFVI;

the network operation and management entity includes an operation support system OSS or an element management system EMS; and the virtualized network function entity includes a virtualized network function unit VNF or a virtualized network function component VNFC.

Optionally, the initial credential information may further be initial credential information configured for the virtualized network function entity by the first management entity NFVO, the second management entity VNFM, or the network operation and management entity.

Optionally, the obtaining, by the virtualized network function entity, from a certificate authority by using the initial credential information, a formal certificate issued by a network operator of the virtualized network function entity includes:

sending, by the virtualized network function entity, a certificate request message to the certificate authority, where the certificate request message includes a third public key and the initial credential, so that the certificate authority verifies the received certificate request message by using the initial credential; and when the verification succeeds, signs the third public key by using a private key corresponding to a root certificate or an intermediate certificate of the network operator, to generate the formal certificate issued by the network operator;

receiving, by the virtualized network function entity, a certificate response message sent by the certificate authority, where the certificate response message includes the formal certificate, or the certificate response message further includes the root certificate of the network operator; and verifying, by the virtualized network function entity, the certificate response message, and when the verification succeeds, obtaining the formal certificate issued by the network operator.

Optionally, the third public key is a public key in a third public key-private key pair that is generated by the virtualized network function entity or that is configured;

if the initial credential is a certificate, the certificate request message is signed by using a private key corresponding to the initial certificate; and the certificate response message includes an authentication certificate, and is signed by using a private key corresponding to the authentication certificate.

Optionally, the authentication certificate is issued by the root certificate or the intermediate certificate of the network operator; and if the authentication certificate is issued by the intermediate certificate of the network operator, the method further includes:

verifying, by the virtualized network function entity, the authentication certificate by using the intermediate certificate of the network operator, and verifying the intermediate certificate by using the root certificate of the network operator.

According to a third aspect, a virtualized network management entity is provided, including:

an obtaining module, configured to obtain initial credential information of a virtualized network function entity; and an instantiation module, configured to install the initial credential information onto the virtualized network function entity during or after instantiation of the virtualized network function entity, so that the virtualized network function entity obtains, from a certificate authority by using the initial credential information, a formal certificate issued by a network operator of the virtualized network function entity.

Optionally, the obtaining module is configured to receive an instantiation request sent by a network operation and management entity, and obtain the initial credential information, included in the instantiation request, of the virtualized network function entity.

Optionally, the obtaining module is further configured to obtain the initial credential information of the virtualized network function entity from the virtualized network function package, an image file of the virtualized network function, the virtualized network function descriptor VNFD, or instantiation data of the virtualized network function, where the virtualized network function package, the image file, the VNFD, or the instantiation data is sent by the network operation and management entity to the virtualized network management entity before or during the instantiation of the virtualized network function entity by the virtualized network management entity, and the virtualized network function package, the VNFD, the image file, or the instantiation data includes the initial credential information.

Optionally, the initial credential information includes but is not limited to a certificate, a pre-shared key, a token and/or a password.

Optionally, when the initial credential information includes a certificate, the initial credential information includes an initial certificate and a corresponding first private key; and the initial certificate is issued by a provider or the network operator of the virtualized network function entity to the virtualized network function entity, and the first private key is a private key in a first public key-private key pair corresponding to the initial certificate.

Optionally, the initial certificate is signed by using a private key corresponding to a root certificate or an intermediate certificate of the provider of the virtualized network function entity, where the intermediate certificate of the provider of the virtualized network function entity is a certificate issued by a lower-level sub-certificate subordinate to the root certificate of the provider of the virtualized network function entity; or the initial certificate is signed by using a private key corresponding to a root certificate or an intermediate certificate of the network operator of the virtualized network function entity, where the intermediate certificate of the network operator of the virtualized network function entity is a certificate issued by a lower-level sub-certificate subordinate to the root certificate of the network operator of the virtualized network function entity.

Optionally, the virtualized network management entity includes a first management entity NFVO, a second management entity VNFM, a third management entity VIM, and a management and control unit of a fourth management entity NFVI;

the network operation and management entity includes an operation support system OSS or an element management system EMS; and the virtualized network function entity includes a virtualized network function unit VNF or a virtualized network function component VNFC.

Optionally, the initial credential information is initial credential information configured for the virtualized network function entity by the first management entity NFVO, the second management entity VNFM, or the network operation management system.

Optionally, the initial credential information is sent by the first management entity NFVO to the third management entity VIM, or is sent by the second management entity VNFM to the third management entity VIM by using the first management entity NFVO, or is sent by the second management entity VNFM to the third management entity VIM.

Optionally, the initial credential information is sent by the third management entity VIM to the management and control unit of the fourth management entity NFVI during or after instantiation of the VNF, and is installed by the management and control unit of the fourth management entity NFVI onto the virtualized network function entity by using a virtual machine.

According to a fourth aspect, a virtualized network function entity is provided, including:
- a first obtaining module, configured to obtain initial credential information during or after instantiation of the virtualized network function entity by a virtualized network management entity; and
- a second obtaining module, configured to obtain, from a certificate authority by using the initial credential information obtained by the first obtaining module, a formal certificate issued by a network operator of the virtualized network function entity.

Optionally, the initial credential information includes but is not limited to a certificate, a pre-shared key, a token and/or a password.

Optionally, when the initial credential information includes a certificate, the initial credential information includes an initial certificate and a corresponding first private key; and
the initial certificate is issued by a provider or the network operator of the virtualized network function entity to the virtualized network function entity, and the first private key is a private key in a first public key-private key pair corresponding to the initial certificate.

Optionally, the initial certificate is signed by using a private key corresponding to a root certificate or an intermediate certificate of the provider of the virtualized network function entity, where the intermediate certificate of the provider of the virtualized network function entity is a certificate issued by a lower-level sub-certificate subordinate to the root certificate of the provider of the virtualized network function entity; or
the initial certificate is signed by using a private key corresponding to a root certificate or an intermediate certificate of the network operator of the virtualized network function entity, where the intermediate certificate of the network operator of the virtualized network function entity is a certificate issued by a lower-level sub-certificate subordinate to the root certificate of the network operator of the virtualized network function entity.

Optionally, the initial credential information is carried in the virtualized network function package, an image file of the virtualized network function, the virtualized network function descriptor VNFD, or instantiation data of the virtualized network function.

Optionally, the virtualized network management entity includes a first management entity NFVO, a second management entity VNFM, a third management entity VIM, and a management and control unit of a fourth management entity NFVI;
the network operation and management entity includes an operation support system OSS or an element management system EMS; and
the virtualized network function entity includes a virtualized network function unit VNF or a virtualized network function component VNFC.

Optionally, the initial credential information may further be initial credential information configured for the virtualized network function entity by the first management entity NFVO, the second management entity VNFM, or the network operation and management entity.

Optionally, the second obtaining module specifically includes:
- a sending unit, configured to send a certificate request message to the certificate authority, where the certificate request message includes a third public key and the initial credential, so that the certificate authority verifies the received certificate request message by using the initial credential; and when the verification succeeds, signs the third public key by using a private key corresponding to a root certificate or an intermediate certificate of the network operator, to generate the formal certificate issued by the network operator;
- a receiving unit, configured to receive a certificate response message sent by the certificate authority, where the certificate response message includes the formal certificate, or the certificate response message further includes the root certificate of the network operator;
- a verification unit, configured to verify the certificate response message, and verify the authentication certificate by using a preset root certificate of the network operator or the root certificate of the network operator included in the certificate response message; and
- an obtaining unit, configured to: when the verification unit succeeds in the verification, obtain the formal certificate issued by the network operator.

Optionally, the third public key is a public key in a third public key-private key pair that is generated by the virtualized network function entity or that is configured;
the certificate request message is signed by using a private key corresponding to the initial credential; and
the certificate response message includes an authentication certificate, and is signed by using a private key corresponding to the authentication certificate.

Optionally, the authentication certificate is issued by the root certificate or the intermediate certificate of the network operator; and
if the authentication certificate is issued by the intermediate certificate of the network operator, the method further includes:
verifying, by the virtualized network function entity, the authentication certificate by using the intermediate certificate of the network operator, and verifying the intermediate certificate by using the root certificate of the network operator.

According to a fifth aspect, a network function virtualization-based certificate configuration system is provided, including: a virtualized network function entity, a virtualized network management entity, and a certificate authority, where
the virtualized network management entity is the virtualized network management entity according to the third aspect;
the virtualized network function entity is the virtualized network function entity according to the fourth aspect; and
the certificate authority is configured to receive a certificate request message sent by the virtualized network function entity, where the certificate request message includes a third public key and the initial credential; verify the received certificate request message by using the initial credential; and when the verification succeeds, sign the third public key by using a private key corresponding to a root certificate or an intermediate certificate of the network operator, to generate a formal certificate issued by the network operator, where the third public key is a public key in a third public key-private key pair that is generated by the virtualized network function entity or that is configured.

According to a sixth aspect, a server is provided, including a processor and a memory, where the processor and the memory are connected by using a bus, a corresponding instruction for implementing the network function virtualization-based certificate configuration method according to the first aspect is stored in the memory, and the processor executes the corresponding instruction for implementing the network function virtualization-based certificate configuration method according to the first aspect.

According to a seventh aspect, a server is provided, including a processor and a memory, where the processor and the memory are connected by using a bus, a corresponding instruction for implementing the network function virtualization-based certificate configuration method according to the second aspect is stored in the memory, and the processor executes the corresponding instruction for implementing the network function virtualization-based certificate configuration method according to the second aspect.

In the embodiments of the invention, a virtualized network management entity obtains initial credential information of a virtualized network function entity, and installs the initial credential information of the virtualized network function entity onto the virtualized network function entity in a targeted manner during or after instantiation of the virtualized network function entity, so that the virtualized network function entity obtains, from a certificate authority by using the initial credential information, a formal certificate issued by a network operator of the virtualized network function entity. A certificate configuration method in the embodiments not only can apply to a network function virtualization scenario, but also can resolve a problem of a security risk in network function virtualization.

BRIEF DESCRIPTION OF DRAWINGS

To describe the technical solutions in the embodiments of the invention more clearly, the following briefly describes the accompanying drawings for describing the embodiments. Apparently, the accompanying drawings in the following description show some embodiments of the invention, and persons of ordinary skill in the art may still derive other drawings from these accompanying drawings without creative efforts.

DESCRIPTION OF EMBODIMENTS

Figure 1:
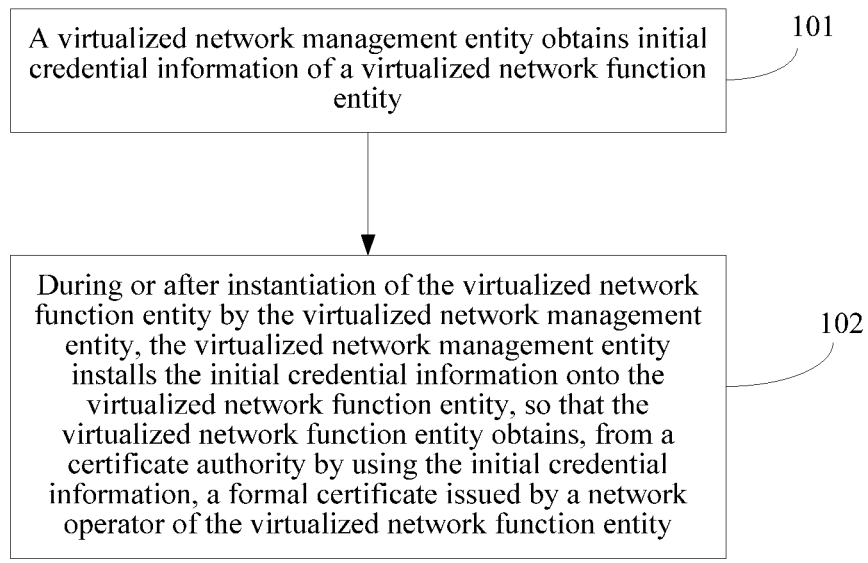
FIG. 1 is a schematic flowchart of a network function virtualization-based certificate configuration method according to an embodiment of the invention.

To make the objectives, technical solutions, and advantages of the embodiments of the invention clearer, the following clearly describes the technical solutions in the embodiments of the invention with reference to the accompanying drawings in the embodiments of the invention. Apparently, the described embodiments are some but not all of the embodiments of the invention. All other embodiments obtained by persons of ordinary skill in the art that is based on the embodiments of the invention without creative efforts shall fall within the protection scope of the invention.

The technical solutions in the embodiments are applied to an NFV scenario. For example, the virtualized network function entity in the embodiments includes a virtualized network function unit (VNF) or a virtualized network function component (VNFC).

The VNF corresponds to a physical network function entity (PNF) on a conventional non-virtualized network. A functional behavior and state of a network function is irrelevant to whether the network function is virtualized or not. In the embodiments, the VNF and the PNF have a same functional behavior and external interface.

The VNF may include multiple lower-level components. Therefore, one VNF may be deployed on multiple virtual machines (VM), where each VM is hosted on one VNFC; the VNF may also be deployed on one VM.

For example, the virtualized network management entity in the embodiments includes but is not limited to a first management entity (NFV Orchestrator, NFVO), a second management entity (VNF Manager, VNFM), a third management entity (Virtualized Infrastructure Manager, VIM), and a management and control unit of a fourth management entity (Network Function Virtualization Infrastructure, NFVI), for example, an NFVI Agent or an NFVI Manager, where the VIM is a virtualized entity used to control and manage computation, storage, and network resources;

the NFVO is a virtualized entity responsible for performing network-side arrangement and management on NFV resources, and implementing an NFV service topology on an NFV infrastructure; and the NFVI includes hardware resources, virtual resources, and a virtualization layer, and from the perspective of the VNF, the virtualization layer and the hardware resource look like an entity that can provide a needed virtual resource. The management and control unit of the NFVI is responsible for managing and controlling a virtual machine in the NFVI.

The VNFM is responsible for managing a life cycle of a VNF instance.

In the embodiments, the network operation and management entity includes but is not limited to an operation support system (Operation support system, OSS) or an element management system (Element Management System, EMS), where the EMS mainly performs conventional FCAPS functions for the VNF, and the FCAPS functions include fault management (Fault Management), configuration management (Configuration Management), accounting management (Accounting Management), performance management (Performance Management), and security management (Security Management).

FIG. 1 is a schematic flowchart of a network function virtualization-based certificate configuration method according to an embodiment of the invention. As shown in FIG. 1, the method includes:

101: A virtualized network management entity obtains initial credential information of a virtualized network function entity.

In an optional implementation manner, when being specifically implemented, step 101 includes:

receiving, by the virtualized network management entity, an instantiation request sent by a network operation and management entity, where the instantiation request includes the initial credential information of the virtualized network function entity. For example, an NFVO receives a VNF instantiation request of an operation support system OSS to request to instantiate a new VNF, where the VNF instantiation request includes initial credential information of the VNF. For another example, an EMS sends a VNF instantiation request to a VNFM, where the VNF instantiation request includes initial credential information of a VNF.

For example, initial credential information of the virtualized network function entity may be initial credential information that is configured for the virtualized network function entity by a provider or a network operator of a VNF. Specifically, the provider or the network operator of the VNF may configure a piece of initial credential information for the VNF or for each VNFC that forms the VNF. For example, when the provider or the network operator of the VNF configures a piece of initial credential information for a VNFC, one initial credential is successfully installed on each VNFC after VNF instantiation succeeds; and subsequently after the VNFC successfully completes a certificate enrolment process, the VNFC obtains a formal certificate issued by the network operator. When the provider or the network operator of the VNF configures a piece of initial credential information for the VNF, after VNF instantiation succeeds, one initial credential is successfully installed (for example, by using a Master VNF or VNFM Agent) on the VNF that functions as a whole. Subsequently, after the VNF successfully completes a certificate enrolment process, the VNF that functions as a whole obtains a formal certificate issued by the network operator.

For example, the initial credential information includes but is not limited to at least one of a certificate, a pre-shared key, a token (token), or a password.

When the initial credential information includes a certificate, the initial credential information includes an initial certificate and a corresponding first private key, where the initial certificate is a certificate issued by a provider or a network operator of the virtualized network function entity to the virtualized network function entity, where the first private key is a private key in a first public key-private key pair.

The initial certificate is signed by using a private key corresponding to a root certificate or an intermediate certificate of the provider of the virtualized network function entity, where the intermediate certificate of the provider of the virtualized network function entity is a certificate issued by a lower-level sub-certificate subordinate to the root certificate of the provider of the virtualized network function entity; or the initial certificate is signed by using a private key corresponding to a root certificate or an intermediate certificate of the network operator of the virtualized network function entity, where the intermediate certificate of the network operator of the virtualized network function entity is a certificate issued by a lower-level sub-certificate subordinate to the root certificate of the network operator of the virtualized network function entity.

For example, the initial credential information may be carried in a VNF package (VNF Package), where the VNF package includes a VNF descriptor (VNF Descriptor, VNFD), a software image file (software image(s)) associated with a VNF, and another archive file, where the VNFD is a resource descriptor for describing a VNF virtual resource requirement.

Specifically, in this embodiment, the initial credential information may be carried in a VNFD or an image file in the VNF package. To enhance security, in this embodiment, for example, the VNF package or the VNFD or the image file in the VNF package may be signed by using a certificate configured by the provider or the network operator of the VNF, or confidentiality of the initial credential information may be protected. The certificate configured by the provider or the network operator of the VNF may be any certificate of certificates that are configured for the VNF by the provider or the network operator of the VNF, or may be a newly generated certificate that is specially used to sign the VNF package, the VNFD, or the image file. Correspondingly, the virtualized network management entity may perform, by using the certificate configured for the VNF by the provider or the network operator of the VNF, integrity verification on the VNF package, the VNFD, or the image file that carries the initial credential information.

Specifically, in this embodiment, the initial credential information may be further carried in instantiation data.

In this embodiment, the virtualized network management entity includes a first management entity NFVO, a second management entity VNFM, a third management entity VIM, and a management and control unit of a fourth management entity NFVI;

the network operation and management entity includes an operation support system OSS or an element management system EMS; and the virtualized network function entity includes a virtualized network function unit VNF or a virtualized network function component VNFC.

For example, the initial credential information is configured for the virtualized network function entity by the first management entity NFVO, the second management entity VNFM, or the network operation and management entity.

In an optional implementation manner, a specific implementation instance of step 101 further includes:

the provider or the network operator of the virtualized network function entity may configure the initial credential information for the virtualized network function entity; the initial credential information is stored in an image file of the virtualized network function entity, and the initial credential information is uploaded to a VIM; and during or after VNF instantiation of the virtualized network function entity, the initial credential information of the virtualized network function entity may be obtained from the image file of the virtualized network function entity.

In an optional implementation manner, for example, when being specifically implemented, for example, step 101 further includes:

after receiving an instantiation request sent by the network operation and management entity or after instantiating the virtualized network function entity, the virtualized network management entity configures the initial credential information for the virtualized network function entity. For example, the NFVO or the VNFM configures the initial credential information for the virtualized network function entity.

102: During or after instantiation of the virtualized network function entity by the virtualized network management entity, the virtualized network management entity installs the initial credential information onto the virtualized network function entity, so that the virtualized network function entity obtains, from a certificate authority by using the initial credential information, a formal certificate issued by a network operator of the virtualized network function entity.

For example, the initial credential information is sent by the first management entity NFVO to the third management entity VIM, or is sent by the second management entity VNFM to the third management entity VIM by using the first management entity NFVO, or is sent by the second management entity VNFM to the third management entity VIM.

Alternatively, the initial credential information is sent by the third management entity VIM to the management and control unit of the fourth management entity NFVI during or after instantiation of the VNF, and is installed by the management and control unit of the fourth management entity NFVI onto the virtualized network function entity by using a virtual machine.

Alternatively, the initial credential information is sent by the NFVO to the VIM, or is sent by the VNFM to the VIM by using the NFVO, or is sent by the VNFM to the VIM, where the initial credential information is sent by the VIM to the management and control unit of the NFVI during or after instantiation of the VNF, and is installed by the management and control unit of the NFVI onto the virtualized network function entity by using a virtual machine.

In this embodiment, the instantiation refers to a process in which the virtualized network management entity allocates a needed virtual resource to the virtualized network function entity and installs instantiation data for the virtualized network function entity.

Figure 2:
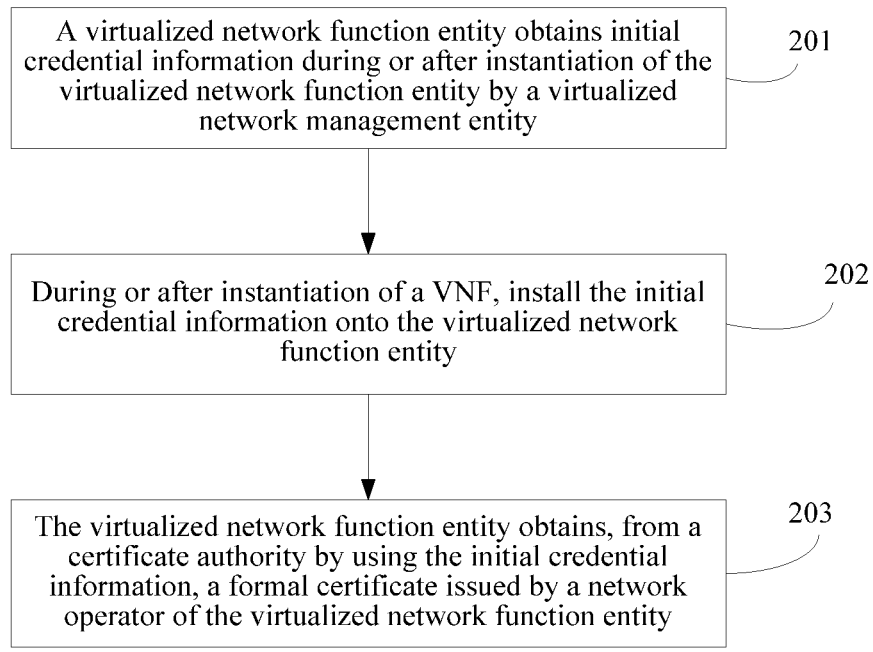
FIG. 2 is a schematic flowchart of a network function virtualization-based certificate configuration method according to another embodiment of the invention.

For specific implementation in which the virtualized network function entity obtains, from the certificate authority (Certificate Authority, CA) by using the initial credential information, the formal certificate issued by the network operator of the virtualized network function entity, refer to related descriptions in the embodiment shown in FIG. 2.

In this embodiment of the invention, a virtualized network management entity obtains or configures initial credential information of a virtualized network function entity, and installs the initial credential information onto the virtualized network function entity during or after instantiation of the virtualized network function entity, so that the virtualized network function entity obtains, from a certificate authority by using the initial credential information, a formal certificate issued by a network operator of the virtualized network function entity. The certificate configuration method in this embodiment may apply to a network function virtualization scenario.

Further, in this embodiment, during or after instantiation of a virtualized network function entity, initial credential information of the virtualized network function entity is installed onto the virtualized network function entity in a targeted manner, so that the virtualized network function entity obtains, from the certificate authority by using the initial credential information, the formal certificate issued by the network operator of the virtualized network function entity. In this way, a unique certificate is installed on a VNF instance, to establish a secure connection, and security of virtual network communication is enhanced.

FIG. 2 is a schematic flowchart of a network function virtualization-based certificate configuration method according to another embodiment of the invention. As shown in FIG. 2, the method includes:

201: A virtualized network function entity obtains initial credential information during or after instantiation of the virtualized network function entity by a virtualized network management entity.

The instantiation refers to a process in which the virtualized network management entity allocates a needed virtual resource to the virtualized network function entity and installs instantiation data for the virtualized network function entity.

For example, the initial credential information may be carried in a VNF package, a VNFD, or an image file of a virtualized network function, or may be carried in instantiation data, where the VNFD or the image file is signed by using a certificate configured by a provider or a network operator of the virtualized network function entity.

For example, the initial credential information includes but is not limited to a certificate, a pre-shared key, a token (token), or a password.

When the initial credential information includes a certificate, the initial credential information includes an initial certificate and a corresponding first private key, where the initial certificate is a certificate issued by a provider or a network operator of the virtualized network function entity to the virtualized network function entity, where the first private key is a private key in a first public key-private key pair.

The initial certificate is signed by using a private key corresponding to a root certificate or an intermediate certificate of the provider of the virtualized network function entity, where the intermediate certificate of the provider of the virtualized network function entity is a certificate issued by a lower-level sub-certificate subordinate to the root certificate of the provider of the virtualized network function entity; or the initial certificate is signed by using a private key corresponding to a root certificate or an intermediate certificate of the network operator of the virtualized network function entity, where the intermediate certificate of the network operator of the virtualized network function entity is a certificate issued by a lower-level sub-certificate subordinate to the root certificate of the network operator of the virtualized network function entity.

For example, the initial credential information is configured for the virtualized network function entity by the virtualized network management entity after the virtualized network management entity receives an instantiation request sent by the network operation and management entity or after the virtualized network management entity instantiates the virtualized network function entity, where the initial credential information includes but is not limited to: a certificate, a pre-shared key, a token (token), or a password.

When the initial credential information includes a certificate, the initial credential information includes an initial certificate and a corresponding second private key, where the initial certificate is a certificate issued by the virtualized network management entity to a second public key-private key pair configured by the virtualized network function entity, and the second private key is a private key in the second public key-private key pair.

It should be noted that, the provider or the network operator of the VNF may configure a piece of initial credential information for the VNF or for each VNFC that forms the VNF. For example, when the provider or the network operator of the VNF configures a piece of initial credential information for the VNF, after VNF instantiation succeeds, one initial credential is successfully installed (for example, by using a Master VNF or VNFM Agent) on the VNF that functions as a whole. Subsequently, after the VNF successfully completes an enrolment process, the VNF that functions as whole obtains a formal certificate issued by the network operator.

202: During or after instantiation of a VNF, install the initial credential information onto the virtualized network function entity.

For example, the initial credential is sent by the virtualized network management entity to an NFVI; and after a secure startup process of the virtualized network function entity, the initial credential is securely installed on the VNF or the VNFC.

For another example, if the initial credential is configured by an NFVO, the NFVO sends the initial credential information (which may be forwarded by a VNFM, or sent directly) to a VIM, and the VIM sends the initial credential information to a management and control unit of an NFVI (for example, an NFVI Agent, or an NFVI Manager); and then, after a secure startup process, the initial credential is securely installed on the VNF or the VNFC by using a virtual machine.

For another example, if the initial credential is configured by a VNFM, the VNFM sends the initial credential information to a VIM, and the VIM sends the initial credential information to a management and control unit of an NFVI (for example, an NFVI Agent, or an NFVI Manager); and then, after a secure startup process, the initial credential is securely installed on the VNF or the VNFC by using a virtual machine.

203: The virtualized network function entity obtains, from a certificate authority by using the initial credential information, a formal certificate issued by a network operator of the virtualized network function entity.

In an optional implementation manner, step 203 includes:
sending, by the virtualized network function entity, a certificate request message to the certificate authority, where the certificate request message includes a third public key and the initial credential; and
verifying, by the certificate authority, the received certificate request message by using the initial credential.

When the initial credential is an initial certificate, the certificate authority verifies, by using a preset root certificate of a provider or the network operator of the virtualized network function entity, the initial certificate included in the certificate request message, and when the verification succeeds, signs the third public key by using a private key corresponding to the root certificate or an intermediate certificate of the network operator, to generate a formal certificate issued by the network operator.

The certificate authority sends a certificate response message to the virtualized network function entity, where the certificate response message includes the formal certificate and an authentication certificate, or the certificate response message further includes the root certificate of the network operator;
the virtualized network function entity receives the certificate response message sent by the certificate authority; and
the virtualized network function entity verifies the certificate response message by using the received authentication certificate, and verifies the authentication certificate by using a preset root certificate of the network operator or the root certificate of the network operator included in the certificate response message.

For example, the third public key is a public key in a third public key-private key pair that is generated by the virtualized network function entity or that is configured; and
the certificate request message may be signed by using, for example, a private key corresponding to the initial certificate, where the private key corresponding to the initial certificate includes the first private key or second private key.

For example, the certificate response message may be signed by using a private key corresponding to the authentication certificate;
for example, the authentication certificate may be issued by the root certificate or the intermediate certificate of the network operator; and
if the authentication certificate is issued by the intermediate certificate of the network operator, the virtualized network function entity verifies the authentication certificate by using the intermediate certificate of the network operator, and verifies the intermediate certificate by using the root certificate of the network operator.

In this embodiment of the invention, a virtualized network function entity obtains initial credential information during or after instantiation of the virtualized network function entity by a virtualized network management entity; and obtains, from a certificate authority by using the initial credential information, a formal certificate issued by a network operator of the virtualized network function entity. The certificate configuration method in this embodiment may apply to a network function virtualization scenario. Further, in this embodiment, during or after instantiation of a virtualized network function entity, initial credential information of the virtualized network function entity is installed onto the virtualized network function entity in a targeted manner, so that the virtualized network function entity obtains, from the certificate authority by using the initial credential information, the formal certificate issued by the network operator of the virtualized network function entity. By means of the method, a unique certificate issued by an operator is successfully installed on a VNF instance, to subsequently establish a secure connection, and security of virtual network communication can be enhanced.

The following describes in detail a specific implementation means of the network function virtualization-based certificate configuration method according to the invention.

Figure 3:
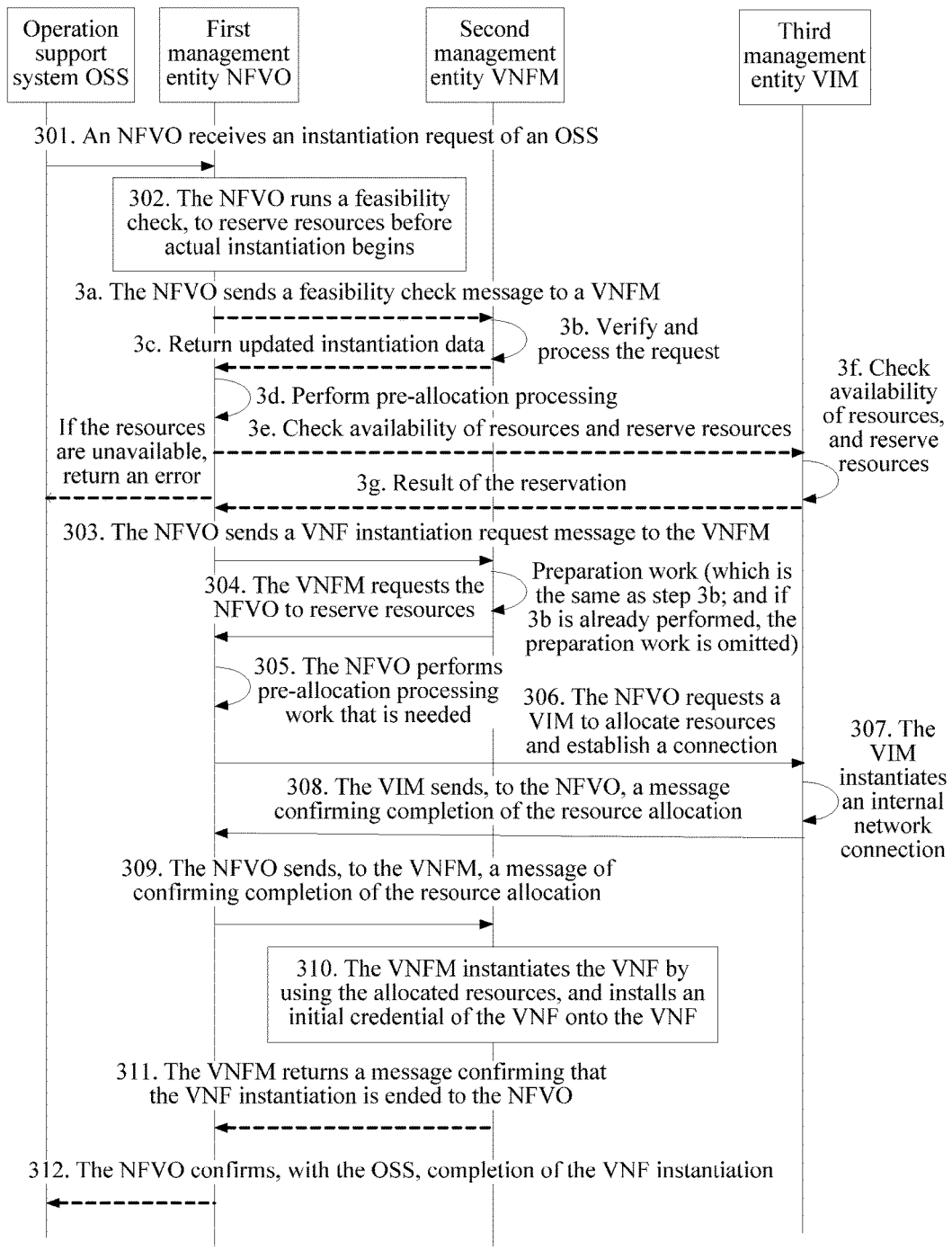
FIG. 3 is a signaling diagram of a network function virtualization-based certificate configuration method according to another embodiment of the invention.

FIG. 3 is a signaling diagram of a network function virtualization-based certificate configuration method according to another embodiment of the invention. As shown in FIG. 3, the method includes:

301: An NFVO receives an instantiation request of an OSS.

The instantiation request is used to request to instantiate a new VNF, where the instantiation request includes initial credential information of the VNF.

Optionally, for example, the initial credential information of the VNF may be carried in a VNFD.

The initial credential information of the VNF may be configured by a provider or a network operator of the VNF. When the initial credential information includes a certificate, the initial credential information specifically includes a VNF initial certificate issued by the provider or the network operator of the VNF and a corresponding private key, or further includes a public key corresponding to the VNF initial credential. The private key and the public key that correspond to the VNF initial certificate are a public key and a private key that are in a first public key-private key pair configured for the VNF by the provider or the network operator of the VNF.

Optionally, the VNF initial credential may be issued for each VNFC.

Optionally, the NFVO verifies the received instantiation request, which includes verifying whether a sender authorizes sending of the instantiation request, verifying whether a transmitted parameter is technically correct and follows a policy, or the like.

302: The NFVO runs a feasibility check, to reserve resources before actual instantiation begins.

The following steps 3a to 3g are optional:

3a) The NFVO sends a feasibility check message to a VNFM, to instruct the VNFM to perform feasibility check on the instantiation request. The feasibility check message carries the initial credential information of the VNF. Optionally, the initial credential information of the VNF may be stored in a VNFD.

3b) The VNFM verifies the instantiation request, and processes a VNFD and instantiation data, which may include modifying or supplementing the instantiation data.

3c) The VNFM returns the instantiation data (which may be updated) to the NFVO.

3d) The NFVO performs pre-allocation processing work that is needed.

3e) The NFVO requests a VIM to check availability of resources (computation, storage, and network resources), and reserves resources.

3f) The VIM checks availability of resources, and reserves resources.

3g) The VIM returns a result of the resource reservation to the NFVO.

303: The NFVO sends a VNF instantiation request message to the VNFM.

The VNF instantiation request message includes the initial credential information of the VNF and the instantiation data. Optionally, the initial credential information of the VNF is stored in the VNFD. Optionally, the VNF instantiation request message may further include information about the reserved resources after steps 3a and 3g are performed.

Preferably, confidentiality and integrity of the VNF instantiation request message are protected. Correspondingly, the VNFM verifies the VNF instantiation request message.

Optionally, the VNFM applies particular limitation to the VNFD to modify or supplement the VNFD for the instantiation data. If step 3b is already performed, the VNFM does not need to apply the particular limitation to the VNFD to modify or supplement the VNFD for the instantiation data.

304: The VNFM requests the NFVO to reserve resources.

305: The NFVO performs pre-allocation processing work that is needed.

306: The NFVO requests the VIM to allocate resources and establish a connection.

307: The VIM instantiates an internal network connection.

For example, the VIM instantiates a needed virtual machine and storage resources, and attaches the instantiated virtual machine to the internal network connection.

308: The VIM sends, to the NFVO, a message confirming completion of the resource allocation.

309: The NFVO sends, to the VNFM, a message confirming completion of the resource allocation.

Optionally, the message confirming completion of the resource allocation carries the initial credential information of the VNF.

310: The VNFM instantiates the VNF by using the allocated resources, and installs an initial credential of the VNF onto the VNF.

For example, the VNFM performs a task of turning on a virtualization deployment unit (Virtualization Deployment Unit, VDU) by using the allocated resources, and instantiates the VNF; and in this process, the initial credential of the VNF is successfully installed onto the VNF.

Optionally, one initial credential is successfully configured for each VNFC that forms the VNF.

311: The VNFM returns a message confirming that VNF instantiation is ended to the NFVO.

312: The NFVO confirms, with the OSS, completion of the VNF instantiation.

In this case, the VNF instantiation is successfully completed. Optionally, in this case, the VNF is in a limited connection state, and is allowed to connect to only the certificate authority of the network operator to perform a certificate enrolment process. Afterwards, the VNF initiates the certificate enrolment process to the certificate authority by using the obtained initial credential, to obtain a formal certificate issued by the network operator.

Optionally, in this embodiment, there is a confidentiality and/or integrity protection mechanism for communication between the OSS and the NFVO, and there is a confidentiality and/or integrity protection mechanism for communication between the NFVO and the VNFM.

In this embodiment of the invention, an NFVO obtains initial credential information of a VNF from an OSS; and when instantiating the VNF, a VNFM installs the initial credential information of the VNF onto the VNF or a VNFC, so that the VNF or the VNFC obtains, from a certificate authority by using the initial credential information, a formal certificate issued by a network operator of the VNF. The certificate configuration method in this embodiment may apply to a network function virtualization scenario. Further, in this embodiment, during instantiation of a VNF, initial credential information of the VNF is installed onto the VNF in a targeted manner, so that the VNF or a VNFC obtains, from the certificate authority by using the initial credential information, the formal certificate issued by the network operator, which does not cause a same certificate to be installed on multiple instances, and can enhance security of virtual network communication.

In a network function virtualization-based certificate configuration method provided in another embodiment of the invention, an initial credential is configured for a VNF or a VNFC by a VNFM during or after instantiation, and is installed onto the VNF or the VNFC by using the following transmission path: VNFM→NFVO→VIM→management and control unit of NFVI→VM.

Step 1 is the same as step 301 in the embodiment shown in FIG. 3.

Step 2 is the same as step 302 in the embodiment shown in FIG. 3, and differences lie in that: in step 3b, the VNFM configures an initial credential for the VNF or the VNFC for which a certificate needs to be configured, and adds the initial credential to the instantiation data; in step 3c, the initial credential is sent to the NFVO; in step 3e, the NFVO sends the initial credential to the VIM.

Step 2 to step 9 are the same as steps 303 to 309 in the embodiment shown in FIG. 3.

In step 10, during instantiation of the VNF, the VIM sends the initial credential information to the NFVI; specifically, the initial credential information is sent to the management and control unit of the NFVI (an NFVI Agent, or an NFVI Manager), and after a secure startup process, the initial credential information is installed onto the VNF or the VNFC by using a VM.

Step 11 is the same as step 311 in the embodiment shown in FIG. 3.

Optionally, the initial credential information may also be sent by the VNFM to the NFVO in step 4, and sent by the NFVO to the VIM in step 6.

Optionally, the initial credential information may also be configured for the VNF or the VNFC by the NFVO, and sent by the NFVO to the VIM in step 3e or step 6.

In the foregoing embodiment, secure connections are established between the VNFM and the NFVO, between the NFVO and the VIM, and between the VIM and the management and control unit of the NFVI, and confidentiality and integrity of information transmitted on the secure connections can be protected.

The configured initial credential is used in a limited manner, and can only be used by the VNF or the VNFC to initiate a certificate enrolment process to a certificate authority of a network operator, to obtain a formal certificate from the network operator.

Figure 4:
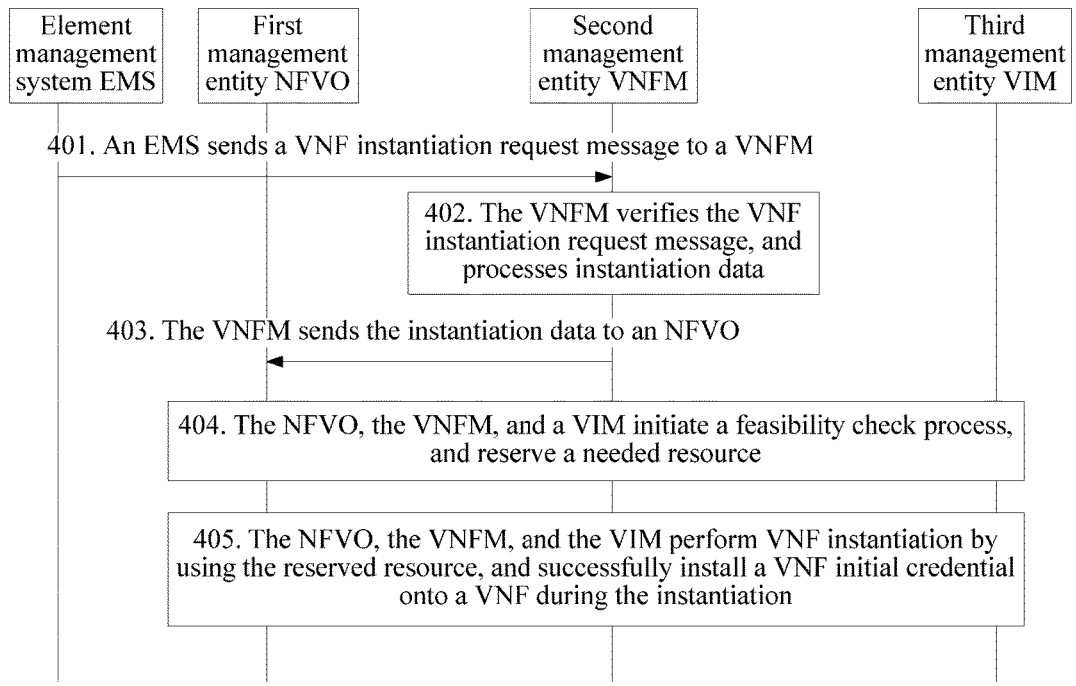
FIG. 4 is a signaling diagram of a network function virtualization-based certificate configuration method according to another embodiment of the invention.

FIG. 4 is a signaling diagram of a network function virtualization-based certificate configuration method according to another embodiment of the invention. As shown in FIG. 4, the method includes:

401: An EMS sends a VNF instantiation request message to a VNFM.

The VNF instantiation request message carries initial credential information of the VNF, where the initial credential information includes but is not limited to a certificate, a pre-shared key, a token (token), or a password.

When the initial credential information of the VNF includes a certificate, the initial credential information specifically includes a VNF initial certificate and a corresponding private key, or further includes a corresponding public key.

Optionally, the VNF initial credential may be issued for each VNFC.

402: The VNFM verifies the VNF instantiation request message, and processes instantiation data.

For example, the VNFM may verify the VNF instantiation request message by using a certificate configured for the VNF by a network operator, process a VNFD and the instantiation data, and may also modify or supplement the instantiation data.

403: The VNFM sends the instantiation data to an NFVO.

The instantiation data sent to the NFVO may be the instantiation data modified or supplemented by the VNFM.

Optionally, the instantiation data sent by the VNFM to the NFVO includes the initial credential information.

Optionally, after step 403, the method further includes:

404: The NFVO, the VNFM, and a VIM initiate a feasibility check process, and reserve needed resources.

Optionally, in this process, the initial credential information is sent by the NFVO to the VIM.

405: The NFVO, the VNFM, and the VIM perform VNF instantiation by using the reserved resources, and successfully install a VNF initial credential onto a VNF during the instantiation.

The VIM sends the initial credential information to the NFVI; specifically, the initial credential is sent to the management and control unit of the NFVI (an NFVI Agent, or an NFVI Manager), and after a secure startup process, the initial credential is installed onto the VNF or the VNFC by using a VM.

Afterwards, the VNFM confirms, with the EMS, completion of the VNF instantiation. In this case, the VNF instantiation is successfully completed. Optionally, in this case, the VNF is in a limited connection state, and is allowed to connect to only the certificate authority of the operator to perform a certificate enrolment process. The VNF initiates the certificate enrolment process to the certificate authority by using the obtained initial credential, to obtain a formal certificate issued by the operator.

Preferably, there is a confidentiality and integrity protection mechanism for communication between the EMS and the VNFM, between the VNFM and the NFVO, between the NFVO and the VIM, and between the VIM and the management and control unit of the NFVI.

In this embodiment of the invention, a VNFM obtains initial credential information of a VNF from an EMS, and sends the initial credential information to a VIM by using an NFVO; and during instantiation of the VNF, the VIM installs the initial credential information of the VNF onto the VNF, so that the VNF obtains, from a certificate authority by using the initial credential information, a formal certificate issued by a network operator of the VNF. The certificate configuration method in this embodiment may apply to a network function virtualization scenario. Further, in this embodiment, during instantiation of a VNF, initial credential information of the VNF is installed onto the VNF in a targeted manner, so that a unique certificate issued by the operator is successfully installed for a VNF instance, to subsequently establish a secure connection, thereby enhancing security of virtual network communication.

Figure 5:
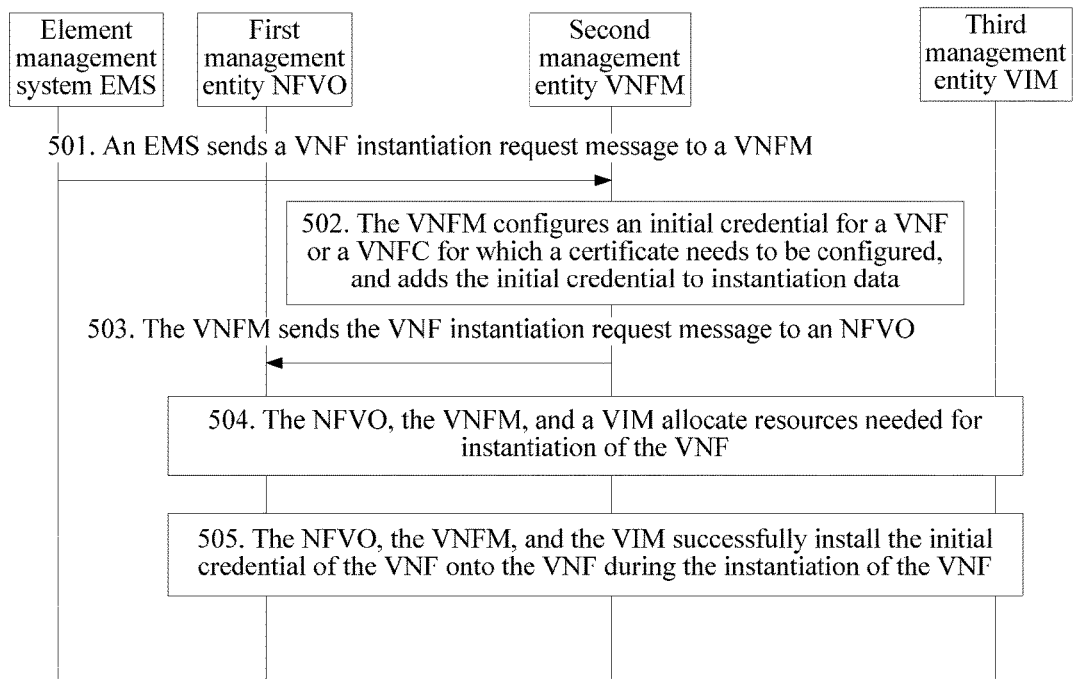
FIG. 5 is a signaling diagram of a network function virtualization-based certificate configuration method according to another embodiment of the invention.

FIG. 5 is a signaling diagram of a network function virtualization-based certificate configuration method according to another embodiment of the invention. As shown in FIG. 5, the method includes:

501: An EMS sends a VNF instantiation request message to a VNFM.

502: The VNFM configures an initial credential for a VNF or a VNFC for which a certificate needs to be configured, and adds the initial credential to instantiation data.

503: The VNFM sends the VNF instantiation request message to an NFVO.

The instantiation request message includes initial credential information.

The initial credential information includes but is not limited to a certificate, a pre-shared key, a token (token), or a password.

Optionally, the NFVO, the VNFM, and a VIM perform feasibility check.

504: The NFVO, the VNFM, and a VIM allocate resources needed for instantiation of the VNF.

Optionally, in this process, the initial credential information is sent by the NFVO to the VIM.

505: The NFVO, the VNFM, and the VIM successfully install the initial credential of the VNF onto the VNF during the instantiation of the VNF.

The VIM sends the initial credential information to the NFVI; specifically, the initial credential is sent to the management and control unit of the NFVI (an NFVI Agent, or an NFVI Manager), and after a secure startup process, the initial credential is installed onto the VNF or the VNFC by using a VM.

Afterwards, the VNFM confirms, with the EMS, completion of the VNF instantiation. In this case, the VNF instantiation is successfully completed. In this case, the VNF is in a limited connection state, and is allowed to connect to only the certificate authority of the network operator to perform a certificate enrolment process, to obtain a formal certificate issued by the network operator.

In this embodiment of the invention, when receiving an instantiation request of an EMS, a VNFM configures initial credential information for a VNF, and sends the initial credential information to a VIM by using an NFVO; and during instantiation of the VNF, the VIM installs the initial credential information of the VNF onto the VNF, so that the VNF obtains, from a certificate authority by using the initial credential information, a formal certificate issued by a network operator of the VNF. The certificate configuration method in this embodiment may apply to a network function virtualization scenario. Further, in this embodiment, during instantiation of a VNF, initial credential information of the VNF is installed onto the VNF in a targeted manner, so that the VNF or a VNFC obtains, from the certificate authority by using the initial credential information, the formal certificate issued by the network operator, and in this way, a unique certificate issued by the operator is successfully installed for a VNF instance, to subsequently establish a secure connection, thereby enhancing security of virtual network communication.

Figure 6:
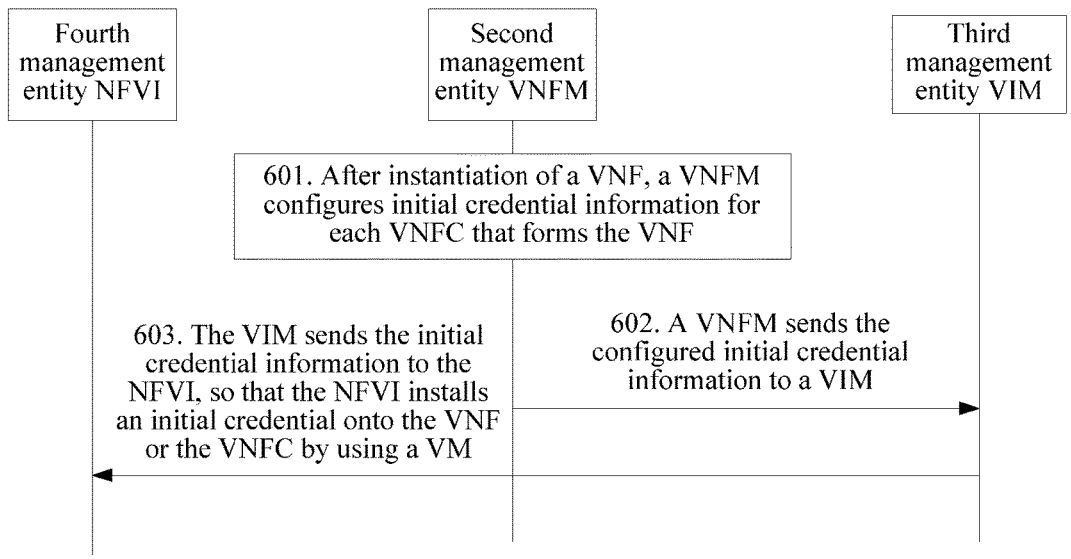
FIG. 6 is a signaling diagram of a network function virtualization-based certificate configuration method according to another embodiment of the invention.

FIG. 6 is a signaling diagram of a network function virtualization-based certificate configuration method according to another embodiment of the invention. As shown in FIG. 6, the method includes:

601: After instantiation of a VNF, a VNFM configures initial credential information for each VNFC that forms the VNF.

The initial credential information includes but is not limited to a certificate, a pre-shared key, a token (token), or a password.

For example, after instantiation of a VNF succeeds, a VNFM may configure initial credential information for each VNF component (that is, VNFC) that forms the VNF. When the initial credential is a certificate, the VNFM configures a second public key-private key pair for the VNFC, and issues an initial certificate for a second public key. The configured initial certificate information includes the initial certificate and a corresponding second private key, or may further include the second public key.

Optionally, after the instantiation of the VNF succeeds, an EMS may also configure initial credential information for each VNF component. When the initial credential is a certificate, the EMS configures a fourth public key-private key pair for the VNFC, and issues an initial certificate for a fourth public key. The configured initial certificate information includes the initial certificate and a corresponding fourth private key, or may further include the fourth public key.

602: The VNFM sends the configured initial credential information to a VIM.

Alternatively, the VNFM sends the configured initial credential information to a VIM by using an NFVO.

603: The VIM sends the initial credential information to an NFVI, so that the NFVI installs an initial credential onto the VNF or the VNFC by using a VM.

Specifically, the initial credential is sent to a management and control unit of the NFVI (an NFVI Agent, or an NFVI Manager), and after a secure startup process, the initial credential is installed onto the VNF or the VNFC by using the VM.

The configured initial credential is used in a limited manner, and can only be used by the VNFC to initiate a certificate enrolment process to a certificate authority of a network operator, to obtain a formal certificate from the network operator.

In this embodiment of the invention, after instantiation of a VNF, a VNFM or an EMS configures initial credential information for the VNF and sends the initial credential information to a VIM, and the VIM installs the initial credential information of the VNF onto the VNF, so that the VNF obtains, from a certificate authority by using the initial credential information, a formal certificate issued by a network operator of the VNF. The certificate configuration method in this embodiment may apply to a network function virtualization scenario. The initial credential information of the VNF may be further installed onto the VNF in a targeted manner, so that the VNF or a VNFC obtains, from the certificate authority by using the initial credential information, the formal certificate issued by the network operator, which prevents a same certificate from being installed on multiple instances, and can enhance security of virtual network communication.

Figure 7:
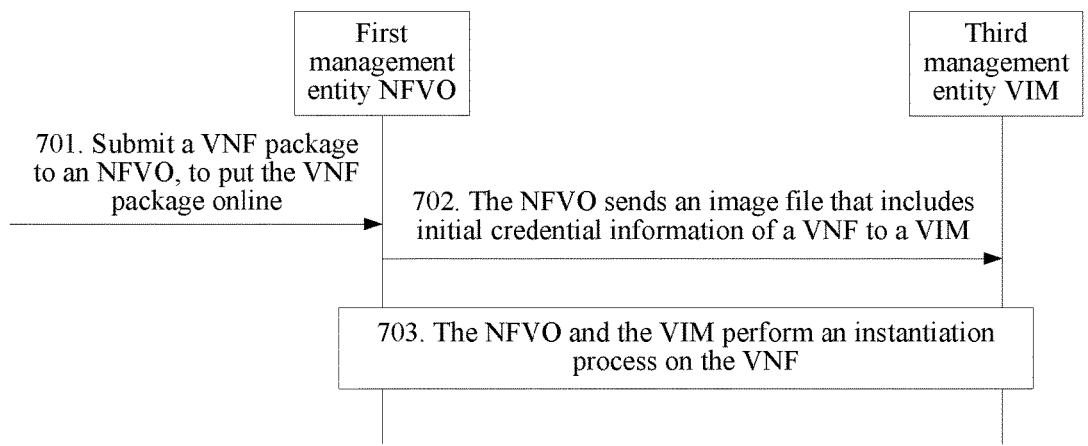
FIG. 7 is a signaling diagram of a network function virtualization-based certificate configuration method according to another embodiment of the invention.

FIG. 7 is a signaling diagram of a network function virtualization-based certificate configuration method according to another embodiment of the invention. As shown in FIG. 7, the method includes:

701: Submit a VNF package to an NFVO, to put the VNF package online.

The VNF package includes initial credential information of a VNF. The initial credential information includes but is not limited to a certificate, a pre-shared key, a token (token), or a password. Optionally, the initial credential information of the VNF is stored in an image file.

Specifically, the NFVO may further verify the VNF package, and instruct a catalog (catalog) to store a VNF) into the catalog.

702: The NFVO sends an image file that includes initial credential information of a VNF to a VIM.

Correspondingly, the VIM confirms, with the NFVO, that the image file has been successfully uploaded.

703: The NFVO and the VIM perform an instantiation process on the VNF.

Specifically, after confirming that the VNF is already online, the NFVO performs the instantiation process on the VNF, and during instantiation, the VIM sends the initial credential information to an NFVI. Specifically, an initial credential is sent to a management and control unit of the NFVI (an NFVI Agent, or an NFVI Manager); and after a secure startup process, the initial credential is installed onto the VNF or the VNFC by using the VM.

The configured initial credential is used in a limited manner, and can only be used by the VNFC to initiate a certificate enrolment process to a certificate authority of a network operator, to obtain a formal certificate from the network operator.

The VNF initiates the certificate enrolment process to the certificate authority of the network operator by using the initial credential, to obtain a formal certificate issued by the operator.

In this embodiment of the invention, a provider or a network operator of a VNF configures an initial credential for the VNF, stores the initial credential into an image file, and uploads the image file to a VIM. After an instantiation process of the VNF succeeds, a certificate is installed onto the VNF, and then the VNF performs a certificate enrolment process to a certificate authority, to obtain a formal certificate issued by the operator. The certificate configuration method in this embodiment may apply to a network function virtualization scenario. Initial credential information of the VNF may be further installed onto the VNF in a targeted manner, so that the VNF or a VNFC obtains, from the certificate authority by using the initial credential information, the formal certificate issued by the network operator, and in this way, a unique certificate issued by the operator is successfully installed for a VNF instance, to subsequently establish a secure connection, thereby enhancing security of virtual network communication.

Figure 8:
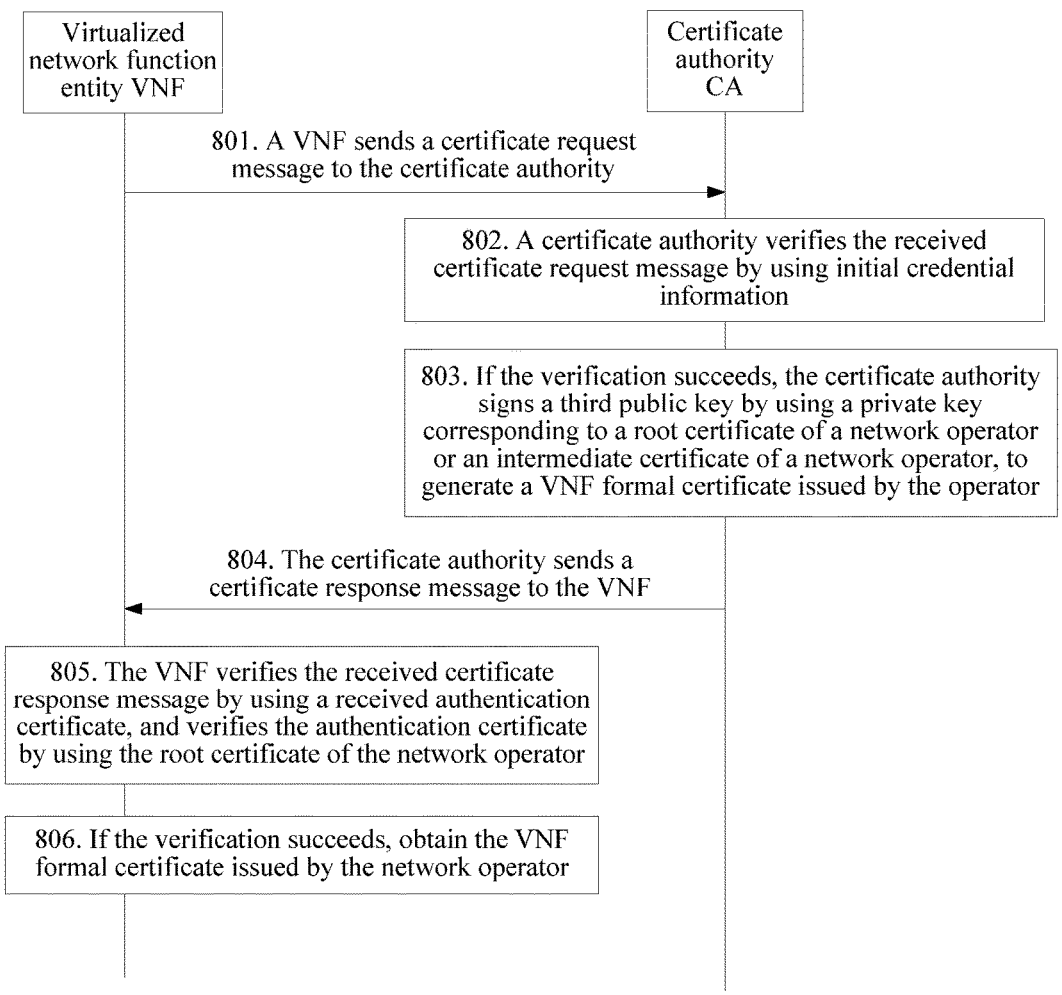
FIG. 8 is a signaling diagram of a network function virtualization-based certificate configuration method according to another embodiment of the invention.

FIG. 8 is a signaling diagram of a network function virtualization-based certificate configuration method according to another embodiment of the invention. This embodiment shows a process in which a VNF obtains, by using a VNF initial credential issued by a provider or a network operator of the VNF and by means of a certificate enrolment (Certificate Enrolment) process defined by the CMPv2 protocol, a formal certificate issued by the operator. In this process, the protocol is not limited to the CMPv2 protocol, and another certificate enrolment protocol may also be used. As shown in FIG. 8, the method includes:

801: A VNF sends a certificate request message to a certificate authority.

If an initial credential is an initial certificate, the certificate request message carries a third public key and the initial certificate.

The certificate request message may be signed by using a private key corresponding to the initial certificate. The third public key may be a pre-configured public key or a public key in a third public key-private key pair generated by the VNF.

The initial certificate is the initial certificate in any embodiment in FIG. 1 to FIG. 7, and details are not described again.

If the initial credential is a shared key, a token, or a password, the certificate request message carries the third public key and the initial credential.

If there is no direct connection interface between the VNF and the certificate authority, the certificate request message may be forwarded by using an EMS.

802: The certificate authority verifies the received certificate request message by using initial credential information.

803: If the verification succeeds, the certificate authority signs a third public key by using a private key corresponding to a root certificate of a network operator or an intermediate certificate of the network operator, to generate a VNF formal certificate issued by the operator.

804: The certificate authority sends a certificate response message to the VNF.

For example, information carried in the certificate response message includes the formal certificate and an authentication certificate. For example, the certificate response message may be signed by using a private key corresponding to the authentication certificate.

If the authentication certificate is not directly issued by the root certificate of the network operator, the information carried in the certificate response message further includes the intermediate certificate of the network operator.

If the VNF already pre-configures the root certificate of the network operator, the certificate response message does not need to carry the root certificate of the network operator any longer; in a case in which the VNF does not pre-configure the root certificate of the network operator, the certificate response message needs to carry the root certificate of the network operator.

805: The VNF verifies the received certificate response message by using a received authentication certificate, and verifies the authentication certificate by using the root certificate of the network operator.

806: If the verification succeeds, obtain the VNF formal certificate issued by the network operator.

For example, the root certificate of the network operator may further be obtained. If the authentication certificate is not directly issued by the root certificate of the network operator, the VNF verifies the authentication certificate by using the intermediate certificate of the network operator, and verifies the intermediate certificate by using the root certificate of the network operator.

Afterwards, a remaining certificate confirmation and interaction process continues to be performed between the VNF and the certificate authority.

In this embodiment of the invention, a VNF or a VNFC obtains, from a certificate authority by using initial credential information, a formal certificate issued by a network operator, and therefore can establish, in a subsequent communication process, a secure connection to a communication peer, which enhances security of virtual network communication.

Figure 9:
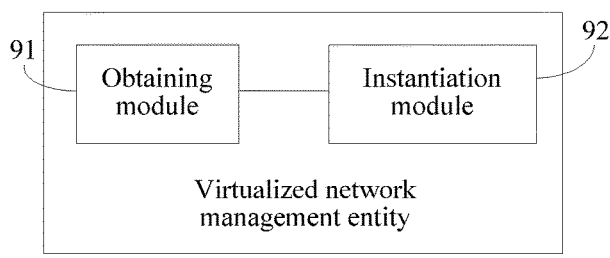
FIG. 9 is a schematic structural diagram of a virtualized network management entity according to an embodiment of the invention.

FIG. 9 is a schematic structural diagram of a virtualized network management entity according to an embodiment of the invention. As shown in FIG. 9, the method includes:

an obtaining module 91, configured to obtain initial credential information of a virtualized network function entity; and an instantiation module 92, configured to install the initial credential information onto the virtualized network function entity during or after instantiation of the virtualized network function entity, so that the virtualized network function entity obtains, from a certificate authority by using the initial credential information, a formal certificate issued by a network operator of the virtualized network function entity.

Optionally, the obtaining module 91 is configured to receive an instantiation request sent by a network operation and management entity, and obtain the initial credential information, included in the instantiation request, of the virtualized network function entity.

Optionally, the obtaining module 91 is further configured to obtain the initial credential information of the virtualized network function entity from the virtualized network function package, an image file of the virtualized network function, the virtualized network function descriptor VNFD, or instantiation data of the virtualized network function, where the virtualized network function package, the image file, the VNFD, or the instantiation data is sent by the network operation and management entity to the virtualized network management entity before or during the instantiation of the virtualized network function entity by the virtualized network management entity, and the virtualized network function package, the VNFD, the image file, or the instantiation data includes the initial credential information.

Optionally, the initial credential information includes but is not limited to a certificate, a pre-shared key, a token and/or a password.

Optionally, when the initial credential information includes a certificate, the initial credential information includes an initial certificate and a corresponding first private key; and the initial certificate is issued by a provider or the network operator of the virtualized network function entity to the virtualized network function entity, and the first private key is a private key in a first public key-private key pair corresponding to the initial certificate.

Optionally, the initial certificate is signed by using a private key corresponding to a root certificate or an intermediate certificate of the provider of the virtualized network function entity, where the intermediate certificate of the provider of the virtualized network function entity is a certificate issued by a lower-level sub-certificate subordinate to the root certificate of the provider of the virtualized network function entity; or the initial certificate is signed by using a private key corresponding to a root certificate or an intermediate certificate of the network operator of the virtualized network function entity, where the intermediate certificate of the network operator of the virtualized network function entity is a certificate issued by a lower-level sub-certificate subordinate to the root certificate of the network operator of the virtualized network function entity.

Optionally, the virtualized network management entity includes a first management entity NFVO, a second management entity VNFM, a third management entity VIM, and a management and control unit of a fourth management entity NFVI;

the network operation and management entity includes an operation support system OSS or an element management system EMS; and the virtualized network function entity includes a virtualized network function unit VNF or a virtualized network function component VNFC.

Optionally, the initial credential information is initial credential information configured for the virtualized network function entity by the first management entity NFVO, the second management entity VNFM, or the network operation management system.

Optionally, the initial credential information is sent by the first management entity NFVO to the third management entity VIM, or is sent by the second management entity VNFM to the third management entity VIM by using the first management entity NFVO, or is sent by the second management entity VNFM to the third management entity VIM.

Optionally, the initial credential information is sent by the third management entity VIM to the management and control unit of the fourth management entity NFVI during or after instantiation of the VNF, and is installed by the management and control unit of the fourth management entity NFVI onto the virtualized network function entity by using a virtual machine.

The virtualized network management entity in this embodiment can execute the certificate configuration method in the embodiment in FIG. 1 or any one of FIG. 3 to FIG. 7, and details about a specific technical effect are not described again.

Figure 10:
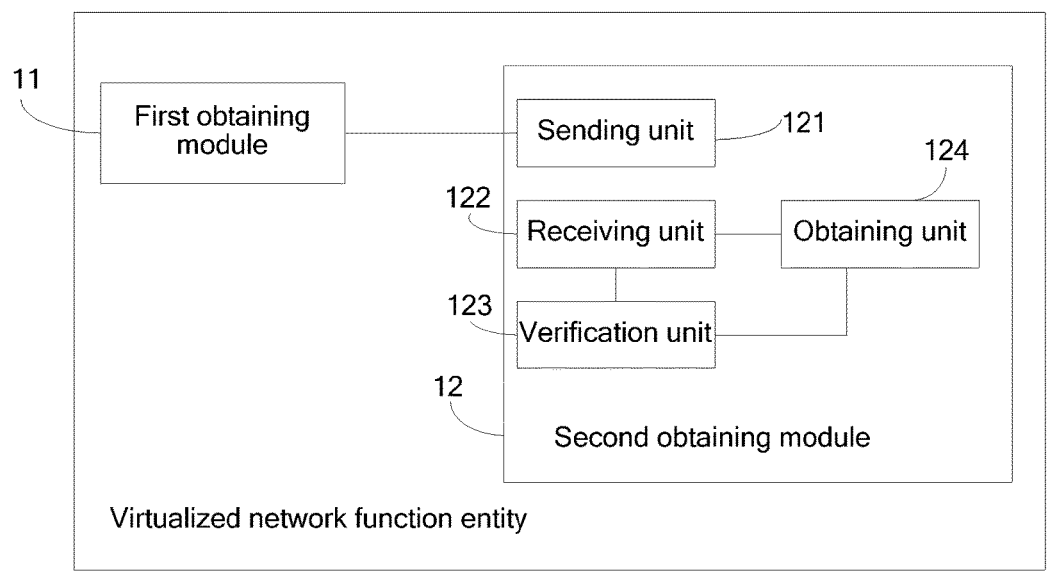
FIG. 10 is a schematic structural diagram of a virtualized network function entity according to an embodiment of the invention.

FIG. 10 is a schematic structural diagram of a virtualized network function entity according to an embodiment of the invention. As shown in FIG. 10, the method includes:

a first obtaining module 11, configured to obtain initial credential information during or after instantiation of the virtualized network function entity by a virtualized network management entity; and a second obtaining module 12, configured to obtain, from a certificate authority by using the initial credential information obtained by the first obtaining module, a formal certificate issued by a network operator of the virtualized network function entity.

Optionally, the initial credential information includes but is not limited to a certificate, a pre-shared key, a token and/or a password.

Optionally, when the initial credential information includes a certificate, the initial credential information includes an initial certificate and a corresponding first private key; and the initial certificate is issued by a provider or the network operator of the virtualized network function entity to the virtualized network function entity, and the first private key is a private key in a first public key-private key pair corresponding to the initial certificate.

Optionally, the initial certificate is signed by using a private key corresponding to a root certificate or an intermediate certificate of the provider of the virtualized network function entity, where the intermediate certificate of the provider of the virtualized network function entity is a certificate issued by a lower-level sub-certificate subordinate to the root certificate of the provider of the virtualized network function entity; or the initial certificate is signed by using a private key corresponding to a root certificate or an intermediate certificate of the network operator of the virtualized network function entity, where the intermediate certificate of the network operator of the virtualized network function entity is a certificate issued by a lower-level sub-certificate subordinate to the root certificate of the network operator of the virtualized network function entity.

Optionally, the initial credential information is carried in the virtualized network function package, an image file of the virtualized network function, the virtualized network function descriptor VNFD, or instantiation data of the virtualized network function.

Optionally, the virtualized network management entity includes a first management entity NFVO, a second management entity VNFM, a third management entity VIM, and a management and control unit of a fourth management entity NFVI;

the network operation and management entity includes an operation support system OSS or an element management system EMS; and the virtualized network function entity includes a virtualized network function unit VNF or a virtualized network function component VNFC.

Optionally, the initial credential information may further be initial credential information configured for the virtualized network function entity by the first management entity NFVO, the second management entity VNFM, or the network operation and management entity.

Optionally, the second obtaining module 12 specifically includes:

a sending unit 121, configured to send a certificate request message to the certificate authority, where the certificate request message includes a third public key and the initial credential, so that the certificate authority verifies the received certificate request message by using the initial credential; and when the verification succeeds, signs the third public key by using a private key corresponding to a root certificate or an intermediate certificate of the network operator, to generate the formal certificate issued by the network operator;

a receiving unit 122, configured to receive a certificate response message sent by the certificate authority, where the certificate response message includes the formal certificate, or the certificate response message further includes the root certificate of the network operator;

a verification unit 123, configured to verify the certificate response message, and verify the authentication certificate by using a preset root certificate of the network operator or the root certificate of the network operator included in the certificate response message; and an obtaining unit 124, configured to: when the verification unit succeeds in the verification, obtain the formal certificate issued by the network operator.

Optionally, the third public key is a public key in a third public key-private key pair that is generated by the virtualized network function entity or that is configured;

the certificate request message is signed by using a private key corresponding to the initial credential; and the certificate response message includes an authentication certificate, and is signed by using a private key corresponding to the authentication certificate.

Optionally, the authentication certificate is issued by the root certificate or the intermediate certificate of the network operator; and if the authentication certificate is issued by the intermediate certificate of the network operator, the method further includes:

verifying, by the virtualized network function entity, the authentication certificate by using the intermediate certificate of the network operator, and verifying the intermediate certificate by using the root certificate of the network operator.

In this embodiment, the virtualized network function entity can execute the certificate configuration method in the embodiment shown in FIG. 2 or FIG. 8, and details about a specific technical effect are not described again.

Figure 11:
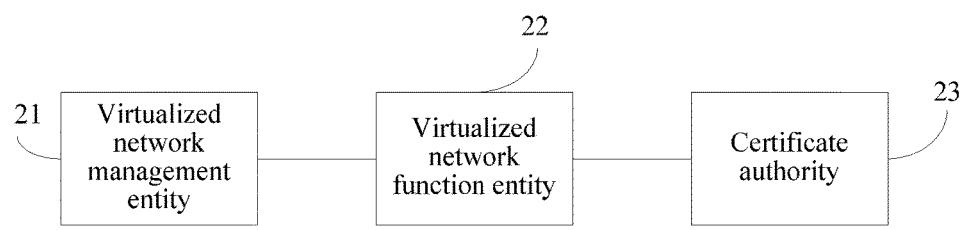
FIG. 11 is a schematic structural diagram of a network function virtualization-based certificate configuration system according to an embodiment of the invention.

FIG. 11 is a schematic structural diagram of a network function virtualization-based certificate configuration system according to an embodiment of the invention. As shown in FIG. 11, the system includes: a virtualized network management entity 21, a virtualized network function entity 22, and a certificate authority 23, where the virtualized network management entity 21 is the virtualized network management entity in the embodiment shown in FIG. 9;

the virtualized network function entity 22 is the virtualized network function entity in the embodiment shown in FIG. 10; and the certificate authority 23 is configured to receive a certificate request message sent by the virtualized network function entity, where the certificate request message includes a third public key and the initial credential; verify the received certificate request message by using the initial credential, and verify, by using a preset root certificate of a provider or a network operator of the virtualized network function entity, an initial certificate included in the certificate request message; and when the verification succeeds, sign the third public key by using a private key corresponding to a root certificate or an intermediate certificate of the network operator, to generate the formal certificate issued by the network operator, where the third public key is a public key in a third public key-private key pair that is generated by the virtualized network function entity or that is configured.

For example, in this embodiment, interfaces used in the NFV system include:

(1) An interface VI-Ha between a virtualization layer and a hardware resource: The virtualization layer may request the hardware resource and collect related hardware resource status information by using the interface.

(2) An interface Vn-Nf between the VNF and the NFVI: This interface describes an execution environment provided by the NFVI for the VNF.

(3) An interface Or-Vnfm between the NFVO and the VNFM: This interface is an internal interface of an MANO, where the NFVO, the VNFM, and the VIM jointly form the MANO, and this interface is specifically used in the following processes:

sending, by the VNF Manager, a resource-related request, such as authorization, verification, reservation, and allocation of a resource, to manage a life cycle of the VNF;

sending, by the NFVO, configuration information to the VNFM, so that the VNF can be properly configured according to a VNF forwarding graph; and collecting status information of the VNF, to manage the life cycle of the VNF.

(4) An interface Vi-Vnfm between the VIM and the VNFM: This interface is an internal interface of the MANO, and is specifically used in the following processes:

sending, by the VNF Manager, a resource allocation request; and configuring a virtual hardware resource and exchanging status information (for example, an event).

(5) An interface Or-Vi between the NFVO and the VIM: This interface is an internal interface of the NFVO, and is specifically used in the following processes:

sending, by the NFVO, a resource reservation request;

sending, by the NFVO, a resource allocation request; and configuring a virtual hardware resource and exchanging status information (for example, an event).

(6) An interface Nf-Vi between the NFVI and the VIM: This interface is specifically used in the following processes:

performing particular resource allocation according to a resource allocation request;

forwarding virtual resource status information; and configuring a virtual hardware resource and exchanging status information (for example, an event).

(7) An interface Os-Ma between an OSS/BSS and the NFVO: This interface is specifically used in the following processes:

requesting to manage a life cycle of a service graph;

requesting to manage the life cycle of the VNF;

forwarding NFV-related status information;

exchanging policy management information;

exchanging data analysis information;

forwarding accounting and usage records that are related to the NFV; and exchanging information about a capacity and an inventory (inventory).

(8) An interface Ve-Vnfm between the VNF/EMS and the VNFM: This interface is specifically used in the following processes:

requesting to manage the life cycle of the VNF;

exchanging configuration information; and exchanging status information for service life cycle management.

(9) Interfaces Se-Ma between a Service, VNF and Infrastructure Description, and the NFVO: This interface is used to receive VNF forwarding graph (forwarding graph)-related information, service-related information, VNF-related information, and NFVI information model-related information. The information is provided for the NFVO to use.

In this embodiment, the NFV system implements a certificate configuration process by using the foregoing interfaces. For specifics, refer to the certificate configuration process in the embodiment in any one of FIG. 1 to FIG. 8. Details are not described again.

In this embodiment, with reference to an IT virtualization technology, the NFV system implements some network functions in general high-performance servers, switches, and storage. Further, private dedicated network element devices on a communications network are replaced with X86 servers and storage and switching devices that are based on an industry standard. In this embodiment, the virtualized network management entity and the virtualized network function entity that are in the NFV system may be implemented in a software manner, can run on general server hardware, and may be migrated, instantiated, and deployed at different locations on a network; and a new device does not need to be installed, which can save great investment costs for an operator. In addition, an open API interface of the NFV system can help the network operator obtain more network capabilities that are more flexible.

Further, the NFV system in this embodiment may further install, during or after instantiation of a VNF or a VNFC, initial credential information of the VNF onto the VNF or the VNFC, so that the VNF or the VNFC can obtain, from a certificate authority by using the initial credential information of the VNF, a formal certificate issued by the network operator of the VNF, and therefore can establish, in a subsequent communication process, a secure connection to a communication peer, enhancing security of virtual network communication.

Figure 12:
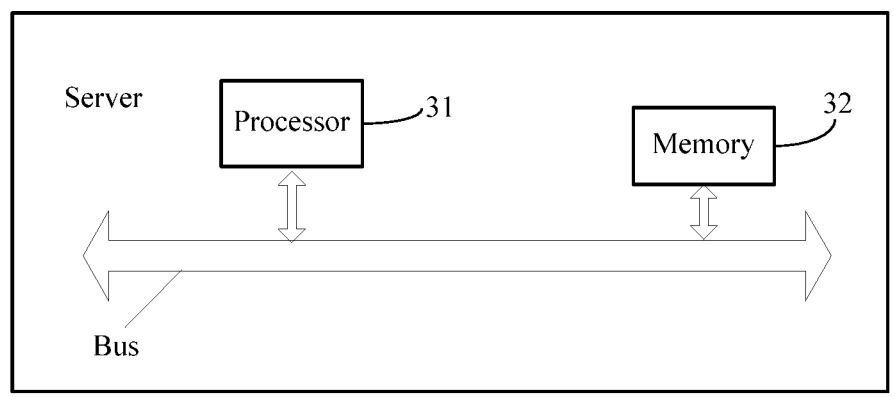
FIG. 12 is a schematic structural diagram of a server according to an embodiment of the invention.

FIG. 12 is a schematic structural diagram of a server according to an embodiment of the invention. As shown in FIG. 12, the server includes a processor 31 and a memory 32, where the processor and the memory are connected by using a bus, where:
a corresponding instruction for implementing the network function virtualization-based certificate configuration method according to the embodiment shown in FIG. 1 is stored in the memory 32, and the processor 32 executes the corresponding instruction for implementing the network function virtualization-based certificate configuration method according to the embodiment shown in FIG. 1.

For specifics, refer to the certificate configuration process in the embodiment in FIG. 1 or any one of FIG. 3 to FIG. 7. Details are not described again.

Figure 13:
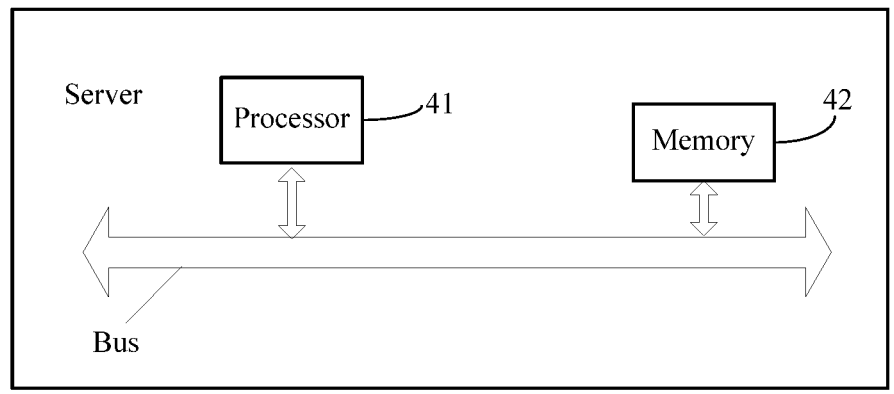
FIG. 13 is a schematic structural diagram of a server according to an embodiment of the invention.

FIG. 13 is a schematic structural diagram of a server according to an embodiment of the invention. As shown in FIG. 13, the server includes a processor 41 and a memory 42, where the processor and the memory are connected by using a bus, where:
a corresponding instruction for implementing the network function virtualization-based certificate configuration method according to the embodiment shown in FIG. 2 is stored in the memory 42, and the processor 41 executes the corresponding instruction for implementing the network function virtualization-based certificate configuration method according to the embodiment shown in FIG. 2.

For specifics, refer to the certificate configuration process in the embodiment shown in FIG. 2 or FIG. 8. Details are not described again.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the invention. The foregoing storage medium includes: any medium that can store program code, such as a removable hard disk, a read-only memory (English: Read-Only Memory, ROM for short), a random access memory (English: Random Access Memory, RAM for short), a magnetic disk, or an optical disc.

Finally, it should be noted that the foregoing embodiments are merely intended for describing the technical solutions of the invention, but not for limiting the invention. Although the invention is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of the embodiments of the invention.

What is claimed is:
1. A network function virtualization-based certificate configuration method, comprising:

obtaining, by a virtualized network management entity, initial credential information of a virtualized network function entity; and during or after instantiation of the virtualized network function (VNF) entity by the virtualized network management entity, installing, by the virtualized network management entity, the initial credential information onto the virtualized network function entity, so that the virtualized network function entity obtains, from a certificate authority by using the initial credential information, a formal certificate issued by a network operator of the virtualized network function entity;

wherein the virtualized network management entity comprises a first management entity network function virtualization orchestrator (NFVO), a second management entity virtualized network function manager (VNFM), a third management entity virtualized infrastructure manager (VIM), and a management and control unit of a fourth management entity network function virtualization infrastructure (NFVI);

a network operation and management entity comprises an operation support system (OSS) or an element management system (EMS); and the virtualized network function entity comprises a virtualized network function unit (VNF) or a virtualized network function component (VNFC);

during or after instantiation of the VNF, sending, by the third management entity VIM, the initial credential information to the management and control unit of the fourth management entity NFVI, and installing, by the management and control unit of the fourth management entity NFVI, the initial credential information onto the virtualized network function entity by using a virtual machine.

2. The method according to claim 1, wherein the obtaining, by a virtualized network management entity, initial credential information of a virtualized network function entity comprises:

receiving, by the virtualized network management entity, an instantiation request sent by the network operation and management entity, wherein the instantiation request comprises the initial credential information of the virtualized network function entity.

3. The method according to claim 1, wherein the obtaining, by a virtualized network management entity, initial credential information of a virtualized network function entity comprises:

obtaining, by the virtualized network management entity, the initial credential information of the virtualized network function entity from a virtualized network function package, an image file of a virtualized network function, a virtualized network function descriptor (VNFD), or instantiation data of a virtualized network function, wherein the virtualized network function package, the image file, the VNFD, or the instantiation data is sent by the network operation and management entity to the virtualized network management entity before or during the instantiation of the virtualized network function entity by the virtualized network management entity, and the VNFD or the image file comprises the initial credential information.

4. The method according to claim 1, wherein the initial credential information comprises but is not limited to a certificate, a pre-shared key, a token or a password.

5. The method according to claim 4, wherein:

when the initial credential information comprises a certificate, the initial credential information comprises an initial certificate and a corresponding first private key; and the initial certificate is issued by a provider or the network operator of the virtualized network function entity to the virtualized network function entity, and the first private key is a private key in a first public key-private key pair corresponding to the initial certificate.

6. The method according to claim 5, wherein:

the initial certificate is signed by using a private key corresponding to a root certificate or an intermediate certificate of the provider of the virtualized network function entity, wherein the intermediate certificate of the provider of the virtualized network function entity is a certificate issued by a lower-level sub-certificate subordinate to the root certificate of the provider of the virtualized network function entity; or the initial certificate is signed by using a private key corresponding to a root certificate or an intermediate certificate of the network operator of the virtualized network function entity, wherein the intermediate certificate of the network operator of the virtualized network function entity is a certificate issued by a lower-level sub-certificate subordinate to the root certificate of the network operator of the virtualized network function entity.

7. The method according to claim 1, wherein the initial credential information is configured for the virtualized network function entity by the first management entity NFVO, the second management entity VNFM, or the network operation and management entity.

8. The method according to claim 1, wherein the initial credential information is sent by the first management entity NFVO to the third management entity VIM, or is sent by the second management entity VNFM to the third management entity VIM by using the first management entity NFVO, or is sent by the second management entity VNFM to the third management entity VIM.

9. The method according to claim 1, wherein the initial credential information is sent by the first management entity NFVO to the second management entity VNFM, or is sent by the network operation and management entity to the VNFM by using the NFVO, or is sent by the network operation and management entity to the VNFM.

10. The method according to claim 9, wherein the initial credential information is installed by the second management entity VNFM onto the virtualized network function entity during or after instantiation of the VNF.

11. A virtualized network management entity, comprising:

a receiver, configured to obtain initial credential information of a virtualized network function entity;

at least one processor; and a non-transitory computer-readable storage medium coupled to the at least one processor and storing programming instructions for execution by the at least one processor, the programming instructions instruct the at least one processor to install the initial credential information onto the virtualized network function entity during or after instantiation of the virtualized network function entity, so that the virtualized network function entity obtains, from a certificate authority by using the initial credential information, a formal certificate issued by a network operator of the virtualized network function entity;

wherein the virtualized network management entity comprises a first management entity network function virtualization orchestrator (NFVO), a second management entity virtualized network function manager (VNFM), a third management entity virtualized infrastructure manager (VIM), and a management and control unit of a fourth management entity network function virtualization infrastructure (NFVI);

during or after instantiation of the VNF, sending, by the third management entity VIM, the initial credential information to the management and control unit of the fourth management entity NFVI, and installing, by the management and control unit of the fourth management entity NFVI, the initial credential information onto the virtualized network function entity by using a virtual machine.

12. The virtualized network management entity according to claim 11, wherein the receiver is configured to receive an instantiation request sent by a network operation and management entity, and obtain the initial credential information, comprised in the instantiation request, of the virtualized network function entity.

13. The virtualized network management entity according to claim 11, wherein the receiver is further configured to obtain the initial credential information of the virtualized network function entity from a virtualized network function package, an image file of a virtualized network function, a virtualized network function descriptor (VNFD), or instantiation data of a virtualized network function, wherein the virtualized network function package, the image file, the VNFD, or the instantiation data is sent by the network operation and management entity to the virtualized network management entity before or during the instantiation of the virtualized network function entity by the virtualized network management entity, and the virtualized network function package, the VNFD, the image file, or the instantiation data comprises the initial credential information.

14. The virtualized network management entity according to claim 11, wherein the initial credential information comprises but is not limited to a certificate, a pre-shared key, a token or a password.

15. The virtualized network management entity according to claim 14, wherein:

when the initial credential information comprises a certificate, the initial credential information comprises an initial certificate and a corresponding first private key; and the initial certificate is issued by a provider or the network operator of the virtualized network function entity to the virtualized network function entity, and the first private key is a private key in a first public key-private key pair corresponding to the initial certificate.

16. The virtualized network management entity according to claim 15, wherein:

the initial certificate is signed by using a private key corresponding to a root certificate or an intermediate certificate of the provider of the virtualized network function entity, wherein the intermediate certificate of the provider of the virtualized network function entity is a certificate issued by a lower-level sub-certificate subordinate to the root certificate of the provider of the virtualized network function entity; or the initial certificate is signed by using a private key corresponding to a root certificate or an intermediate certificate of the network operator of the virtualized network function entity, wherein the intermediate certificate of the network operator of the virtualized network function entity is a certificate issued by a lower-level sub-certificate subordinate to the root certificate of the network operator of the virtualized network function entity.

17. The virtualized network management entity according to claim 11, wherein the initial credential information is initial credential information configured for the virtualized network function entity by the first management entity NFVO, the second management entity VNFM, or the network operation and management entity.

18. A non-transitory computer readable storage medium comprising executable instructions, wherein a processor is configured to execute the instructions to:

obtain, by a virtualized network management entity, initial credential information of a virtualized network function entity; and during or after instantiation of the virtualized network function (VNF) entity by the virtualized network management entity, install, by the virtualized network management entity, the initial credential information onto the virtualized network function entity, so that the virtualized network function entity obtains, from a certificate authority by using the initial credential information, a formal certificate issued by a network operator of the virtualized network function entity;

wherein the virtualized network management entity comprises a first management entity network function virtualization orchestrator (NFVO), a second management entity virtualized network function manager (VNFM), a third management entity virtualized infrastructure manager (VIM), and a management and control unit of a fourth management entity network function virtualization infrastructure (NFVI);

a network operation and management entity comprises an operation support system (OSS) or an element management system (EMS); and the virtualized network function entity comprises a virtualized network function unit (VNF) or a virtualized network function component (VNFC);

during or after instantiation of the VNF, send, by the third management entity VIM, the initial credential information to the management and control unit of the fourth management entity NFVI, and install, by the management and control unit of the fourth management entity NFVI, the initial credential information onto the virtualized network function entity by using a virtual machine.

* * * * *